United States Patent [19]

Reinhart

[11] Patent Number: 5,178,907
[45] Date of Patent: Jan. 12, 1993

[54] PROCESS FOR THE FABRICATION OF HIGH DENSITY CONTINUOUS FIBER PREFORMS

[75] Inventor: Theodore J. Reinhart, Dayton, Ohio

[73] Assignee: The United States of America as represented by the Secretary of the Air Force, Washington, D.C.

[21] Appl. No.: 704,562

[22] Filed: May 17, 1991

[51] Int. Cl.$^5$ ............................................. B05D 2/12
[52] U.S. Cl. ............................... 427/177; 106/287.35; 427/178; 427/299; 427/322; 427/389.9
[58] Field of Search ............ 427/177, 299, 322, 389.9, 427/177, 178; 106/287.35

[56] References Cited

U.S. PATENT DOCUMENTS

| | | | |
|---|---|---|---|
| 3,737,352 | 6/1973 | Avis et al. | 156/181 |
| 3,936,285 | 2/1976 | Maaghul | 65/3.44 |
| 4,397,913 | 8/1983 | Fahey | 65/3.1 |
| 4,477,496 | 10/1984 | Das et al. | 427/375 |
| 4,495,017 | 1/1985 | Abe et al. | 156/181 |
| 4,762,740 | 8/1988 | Johnson et al. | 428/68 |

Primary Examiner—Janyce Bell
Attorney, Agent, or Firm—Charles E. Bricker; Donald J. Singer

[57] ABSTRACT

An aqueous composition for treating fibers for use in the resin transfer/injection molding of high density continuous fiber preforms which comprises about 0.005 to 0.05 php wetting agent, about 0.05 to 0.25 php binder, about 0.10 to 1.00 php polymer, about 0.005 to 0.05 php plasticizer and about 0.05 to 0.25 php water soluble oil, balance water, wherein the term "php" is intended to mean parts per 100 parts water (w/w). This composition, when applied to fibers, allows high fiber tension to be applied during preform fabrication without causing damage due to mechanical abrasion of the fibers. The composition also promotes resin to fiber adhesion and speeds the flow of resin through the dense preform during resin injection/transfer molding.

6 Claims, 1 Drawing Sheet

PROCESS FOR THE FABRICATION OF HIGH DENSITY CONTINUOUS FIBER PREFORMS

RIGHTS OF THE GOVERNMENT

The invention described herein may be manufactured and used by or for the Government of the United States for all governmental purposes without the payment of any royalty.

BACKGROUND OF THE INVENTION

This invention relates to the treatment of fibers for use in the resin transfer/injection molding of high density continuous fiber preforms.

Manufacturing processes for the fabrication of high quality composite, thick walled (i.e., greater than about 0.25-inch) internal or external pressure vessels or other filament wound articles, comprise the winding of wet or prepreg fibers onto a forming mandrel. Filament winding processes, whether wet or prepreg, generally produce high void content structures (about 4 to 10% voids). Structures produced by these processes also exhibit fiber waviness due to resin flow between internal plies.

Filament wound structures can be cured in autoclaves to eliminate voids, but such curing increases the cost of the structures. Autoclave curing also increases internal fiber waviness due to resin flow.

Voids and fiber waviness can be minimized, if not eliminated, by the method of multiple cures of thin layers. Although successful, this method greatly increases the cost of the product. Multiple cures also lead to problems at the interface(s) between such multiple layers.

Processes that produce composites having 2 to 4% voids generally exhibit about 30% reduction in composite compressive strength. The stress concentration in composites having only a 2.5° misalignment causes roughly 50% strength reduction, as compared to composites which are free of voids and fiber waviness.

Resin transfer/injection molding processes have long been acknowledged as producing low cost, dimensionally accurate components at moderate production quantities (about 500 to 5,000 units). Resin transfer molding is a closed mold, low pressure process applicable to the fabrication of complex, high performance composite articles of both large and small size. Several different resin transfer molding processes are well known to those skilled in the art. The process is differentiated from various other molding processes in that reinforcement material, such as fiberglass or other fiber reinforcement material, is placed separately into a molding tool cavity and then combined with resin within the mold cavity to form a fiber reinforced plastic ("FRP") composite product. Typically, a pre-shaped fiber reinforcement (preform) is positioned within a molding tool cavity and the molding tool is then closed. A feed line connects the closed molding tool cavity with a supply of liquid resin and the resin is pumped or otherwise transferred into the tool cavity where it impregnates and envelops the fiber reinforcement, and subsequently cures. The cured or semi-cured FRP product is then removed from the molding tool cavity. As used herein, the terms resin transfer molding and "RTM" refer to any molding process wherein a fiber reinforcement material or structure is positioned within a mold into which resin is subsequently introduced.

The key to the production of high performance components having low voids, low fiber waviness and high fiber content lies in the fabrication of high density, i.e., tightly packed, continuous fiber preforms. Such fabrication requires high fiber tension to compact the dry fiber preform. High fiber tension can, however, seriously degrade, by fiber damage and breakage, the strength of dry reinforcing fibers such as carbon, glass or other materials. Further, the compaction of dry fibers as successive layers are applied causes additional damage due to abrasion.

It is therefore an object of this invention to provide a method for treating fibers for use in the resin transfer/injection molding of high density continuous fiber preforms.

It is another object of this invention to provide a composition for treating fibers for use in the resin transfer/injection molding of high density continuous fiber preforms.

Other objects, aspects and advantages of the present invention will become apparent to those skilled in the art from a reading of the following detailed description of the invention.

SUMMARY OF THE INVENTION

Figure 1:
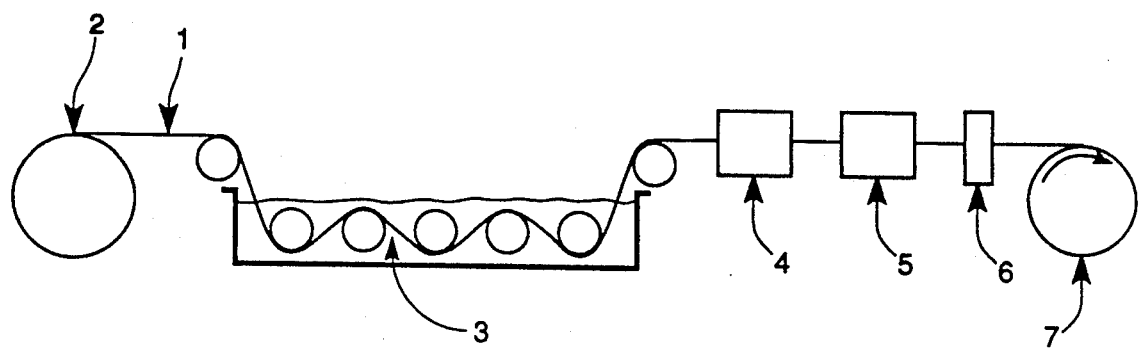
FIG. 1 is a schematic view of an apparatus for carrying out the method of this invention.

In accordance with the present invention, there is provided an aqueous composition for treating fibers for use in the resin transfer/injection molding of high density continuous fiber preforms which comprises about 0.005 to 0.05 php wetting agent, about 0.05 to 0.25 php binder, about 0.10 to 1.00 php polymer, about 0.005 to 0.05 php plasticizer and about 0.05 to 0.25 php water soluble oil, balance water, wherein the term "php" is intended to mean parts per 100 parts water (w/w). This composition, when applied to fibers, allows high fiber tension to be applied during preform fabrication without causing damage due to mechanical abrasion of the fibers. The composition also promotes resin to fiber adhesion and speeds the flow of resin through the dense preform during resin injection/transfer molding.

The method of this invention comprises impregnating fibers with the above-described composition and drying the thus-impregnated fibers. The fibers may be impregnated during fabrication of the preform, as illustrated in FIG. 1. Referring to FIG. 1, a fiber bundle 1 is supplied continuously under a controlled tension from a fiber spool or creel 2 through impregnating or applicator means 3 containing the above-described composition, optional drying means 4, tensioning means 5, guide means 6 and wound onto mandrel 7. Drying means 4 is optional because the impregnated fiber(s) may be wound onto the mandrel 7 in the wetted state and later dried. Tensioning means 5 may also be situated between the spool 2 and the applicator means 4. Optionally, the fiber(s) may be batch-impregnated with the above-described composition while still on the spool, using alternating vacuum/pressure cycles. The thus-impregnated fiber(s) could then be wound, using desired tension, directly on the mandrel 7.

| Component | Broad | General | Preferred |
| --- | --- | --- | --- |
| Wetting Agent | 0.005–0.050 | 0.0075–0.025 | 0.01 |
| Binder | 0.050–0.250 | 0.075–0.150 | 0.10 |

| Component | Broad | General | Preferred |
| --- | --- | --- | --- |
| Polymer | 0.100–1.00 | 0.250–0.750 | 0.50 |
| Plasticizer | 0.005–0.050 | 0.0075–0.025 | 0.01 |
| Water Soluble Oil | 0.050–0.250 | 0.075–0.150 | 0.10 |

The wetting agent may be any wetting agent known in the art. An example of a suitable wetting agent is available commercially under the designation 3MFC430 from Minnesota Mining and Manufacturing Co., St. Paul, MN. An example of a suitable polymer is Klucel-M, an hydroxypropylcellulose, available from Hercules, Inc., Wilmington, DE. An example of a suitable binder is a water soluble phenolic resin available from Ironsides Resins, Columbus, OH. An example of a suitable plasticizer is propyleneglycol.

The fibers used in this invention are those composed of a large number of single filaments, and preferably they are yarns or tows composed of bundles of continuous long filaments. For example, they include organic fibers such as fibers of polyamide, polyester, polyacrylonitrile, and the like; organic heat-resistant fibers such as fibers of aromatic polyamide, polyfluorocarbon, polyamide-imide, polyimide, and the like; rayon and natural fibers; inorganic fibers such as fibers of glass, boron nitride, carbon, silicon nitride, silicon carbide, alumina, zirconia, and the like; as well as fiber bundles composed of a combination of these fibers.

The instant invention is useful in the fabrication of high performance, low cost, composite articles.

Various modifications may be made to the invention as described without departing from the spirit of the invention or the scope of the appended claims.

I claim:

1. An aqueous composition for treating fibers for use in the resin transfer/injection molding of high density continuous fiber preforms which comprises about 0.005 to 0.05 php wetting agent, about 0.05 to 0.25 php of a water soluble phenolic resin, about 0.10 to 1.00 php of a hydroxypropylcellulose, about 0.005 to 0.05 php plasticizer and about 0.05 to 0.25 php water soluble oil, balance water.

2. The composition of claim 1 wherein the quantity of wetting agent is about 0.0075 to 0.025 php, the quantity of said water soluble phenolic resin is about 0.075 to 0.150 php, the quantity of said hydroxypropyl cellulose is about 0.25 to 0.75 php, the quantity of plasticizer is about 0.0075 to 0.025 php and the quantity of water soluble oil is about 0.075 to 0.150 php.

3. The composition of claim 1 wherein the quantity of wetting agent is about 0.01 php, the quantity of said water soluble phenolic resin is about 0.10 php, the quantity of said hydroxypropylcellulose is about 0.50 php, the quantity of plasticizer is about 0.01 php and the quantity of water soluble oil is about 0.10 php.

4. A method for treating fibers for use in the resin transfer/injection molding of high density continuous fiber preforms which comprises treating said fibers with an aqueous composition which comprises about 0.005 to 0.05 php wetting agent, about 0.05 to 0.25 php of a water soluble phenolic resin, about 0.10 to 1.00 php of a hydroxypropylcellulose, about 0.005 to 0.05 php plasticizer and about 0.05 to 0.25 php water soluble oil, balance water.

5. The method of claim 1 wherein said fibers are treated with said composition, wound onto a mandrel and then dried.

6. The method of claim 1 wherein said fibers are treated with said composition, dried and then wound onto a mandrel.

* * * * *

UNITED STATES PATENT AND TRADEMARK OFFICE
CERTIFICATE OF CORRECTION

PATENT NO. : 5,178,907
DATED : January 12, 1993
INVENTOR(S) : Theodore J. Reinhart It is certified that error appears in the above-identified patent and that said Letters Patent is hereby corrected as shown below:

Column 2, line 65, before the Table, insert --The components of the composition of this invention must be at least water-dispersible, preferably water-soluble, and must be compatible with the fiber(s) and resin(s) used. The composition has the recipe: --.

Column 3, line 10, insert a space between "430" and "from".

Signed and Sealed this

Sixteenth Day of November, 1993

Attest:

BRUCE LEHMAN

Attesting Officer     Commissioner of Patents and Trademarks